US012645194B2

(12) United States Patent
Uwano

(10) Patent No.: US 12,645,194 B2
(45) Date of Patent: Jun. 2, 2026

(54) OPERATION MANAGEMENT DEVICE

(71) Applicant: FANUC CORPORATION, Minamitsuru-gun (JP)

(72) Inventor: Tomofumi Uwano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 365 days.

(21) Appl. No.: 18/286,280

(22) PCT Filed: May 7, 2021

(86) PCT No.: PCT/JP2021/017560
§ 371 (c)(1),
(2) Date: Oct. 10, 2023

(87) PCT Pub. No.: WO2022/234668
PCT Pub. Date: Nov. 10, 2022

(65) Prior Publication Data
US 2024/0231304 A1      Jul. 11, 2024

(51) Int. Cl.
*G05B 19/402* (2006.01)
*G06Q 10/06* (2023.01)
*G06Q 50/04* (2012.01)

(52) U.S. Cl.
CPC .. *G05B 19/402* (2013.01); *G05B 2219/50047* (2013.01)

(58) Field of Classification Search
CPC ........ G05B 19/402; G05B 2219/50047; G06Q 10/06; G06Q 50/04

(Continued)

(56) References Cited

U.S. PATENT DOCUMENTS

2006/0023938 A1*   2/2006   Ban ........................ B25J 9/1692
                                                        382/153
2020/0143546 A1*   5/2020   Mehdi ..................... G06T 7/564
(Continued)

FOREIGN PATENT DOCUMENTS

JP        2007-142517        6/2007
JP        2008-248613        10/2008
(Continued)

OTHER PUBLICATIONS

International Search Report (ISR) issued Aug. 10, 2021 in International (PCT) Application No. PCT/JP2021/017560.

*Primary Examiner* — Michael J Brown
(74) *Attorney, Agent, or Firm* — Wenderoth, Lind & Ponack, L.L.P.

(57) ABSTRACT

An operation management device includes a machine tool detection unit which detects industrial machines from videos from cameras based on registered feature points of the industrial machines, a varying point detection unit which detects, from the videos, time-varying feature points of the detected industrial machines and change times, and an individual machine recognition unit which recognizes the individual industrial machines based on the time-varying feature points and change times. The operation management device also includes a camera parameter calculation unit which calculates camera parameters of each camera, a machine distance calculation unit which calculates the distances between the feature points and the cameras based on the camera parameters, and a layout diagram creation unit which creates a layout diagram of icons of the industrial machines from the calculated distances and locations and three-dimensional coordinates of the center of the lens of each camera.

4 Claims, 11 Drawing Sheets

(58) Field of Classification Search
     USPC ......................................................... 700/186
     See application file for complete search history.

(56)                     References Cited

U.S. PATENT DOCUMENTS

2020/0183354 A1 *  6/2020  Atsumi ............... G05B 19/4183
2022/0080308 A1 *  3/2022  Fung .................... G06F 3/0488

FOREIGN PATENT DOCUMENTS

| JP | 2013-171501 | 9/2013 |
| JP | 2017-10200 | 1/2017 |
| JP | 2017-211908 | 11/2017 |
| JP | 2021-21637 | 2/2021 |

* cited by examiner

FEATURE
POINT    20

MACHINE FRONT ZONE

FIG. 6

MACHINE FRONT ZONE

FIG. 7

OPERATION MANAGEMENT DEVICE

TECHNICAL FIELD

The present invention relates to an operation management device.

BACKGROUND ART

In a factory where a plurality of industrial machines such as machine tools and robots are in operation, techniques have been proposed which connect control devices for controlling each industrial machine and management devices for collecting and monitoring data on the operational status of each industrial machine via a network, thereby centrally managing the operational status of each industrial machine. For example, see Patent Document 1.

Patent Document 1: Japanese Unexamined Patent Application, Publication No. 2017-10200

DISCLOSURE OF THE INVENTION

Problems to be Solved by the Invention

However, when creating a layout diagram of the industrial machines on the management device, the user needs to collect identification information and positional information for each of the plurality of industrial machines arranged in the factory by using a terminal device such as a smartphone, which takes time and effort.

Meanwhile, the cost of surveillance cameras has been reduced, and a plurality of network-connectable surveillance cameras are arranged in factories.

Therefore, it is desired to easily create a layout diagram of a plurality of industrial machines arranged in the factory by using videos captured by a plurality of cameras.

Means for Solving the Problems

One aspect of the operation management device of the present disclosure is an operation management device that displays an icon representing at least one industrial machine as arranged on a layout diagram representing an outline of a facility where the industrial machine is installed, in which the operation management device includes: a machine tool detection unit configured to detect the industrial machine installed in the facility from a video from each of a plurality of cameras installed in the facility, based on a plurality of feature points of each industrial machine registered in advance in a machine shape storage unit; a point-of-variation detection unit configured to detect, from among the plurality of feature points of the industrial machine detected, a time-varying feature point and a time when the feature point varied over time, from a video from each of the plurality of cameras; an identical machine recognition unit configured to recognize one or more industrial machines in a video from each of the plurality of cameras, based on the time-varying feature point and the time when the feature point varied over time, detected by the point-of-variation detection unit; a camera parameter calculation unit configured to calculate a camera parameter for each of the plurality of cameras, based on a distance between at least one pair of feature points registered in advance in the machine shape storage unit, and a distance between the feature points in a video of the industrial machines recognized by the identical machine recognition unit; a machine distance calculation unit configured to calculate a distance between each feature point of the industrial machines recognized by the identical machine recognition unit and a center of a lens of each of the plurality of cameras, based on the camera parameter for each of the plurality of cameras calculated by the camera parameter calculation unit; and a layout diagram creation unit configured to create the layout diagram arranged with icons of the industrial machines recognized, based on the distance between each feature point of the industrial machines and the center of the lens of each of the plurality of cameras calculated by the machine distance calculation unit, and the three-dimensional coordinates of the center of the lens of each of the plurality of cameras registered in advance.

Effects of the Invention

According to one aspect of the present disclosure, a layout diagram of industrial machines arranged in a factory can be easily created by using videos captured by a plurality of cameras.

BRIEF DESCRIPTION OF THE DRAWINGS

FIG. 6 is a diagram illustrating an example of a relationship between the machine front zone and thresholds in the video;

FIG. 7 is a diagram illustrating an example of processing for automatically determining cameras that are in a positional relationship allowing for detection with a predetermined degree of accuracy;

PREFERRED MODE FOR CARRYING OUT THE INVENTION

One Embodiment

Figure 1:
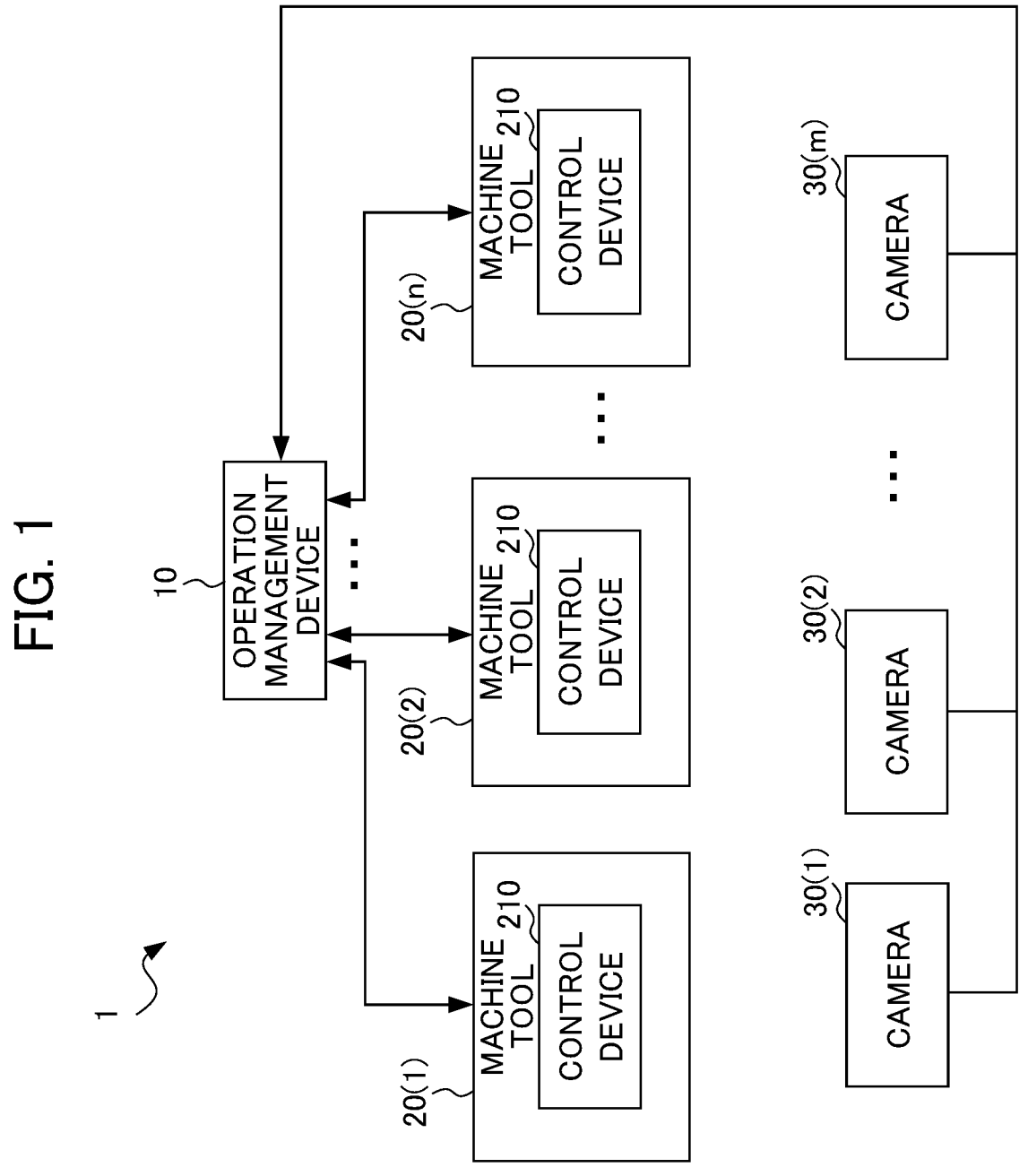
FIG. 1 is a functional block diagram illustrating a functional configuration example of an operation management system according to one embodiment.

FIG. 1 is a functional block diagram illustrating a functional configuration example of an operation management system according to one embodiment. Here, a machine tool is illustrated as an example of industrial machines. Note that the present invention can also be applied to industrial machines such as industrial robots, service robots, forging machines, and injection molding machines.

As illustrated in FIG. 1, the operation management system 1 includes an operation management device 10, n machine tools 20(*l*) to 20(*n*), and m cameras 30(*l*) to 30(*m*) that capture videos (moving images) at a predetermined frame rate (n is an integer greater than or equal to 1, and m is an integer greater than or equal to 2).

The operation management device 10, the machine tools 20(*l*) to 20(*n*), and the cameras 30(*l*) to 30(*m*) may be interconnected via a network such as a LAN (Local Area Network) or the Internet. In this case, the operation management device 10, the machine tools 20(*l*) to 20(*n*), and the cameras 30(*l*) to 30(*m*) are provided with a communication unit (not illustrated) for mutual communication via such connection. Note that the operation management device 10, the machine tools 20(*l*) to 20(*n*), and the cameras 30(*l*) to 30(*m*) may also be directly interconnected via a connection interface (not illustrated), either wired or wireless.

The machine tools 20(*l*) to 20(*n*) are machine tools known to those skilled in the art and include a control device 210. The machine tools 20(*l*) to 20(*n*) move based on movement commands from the control device 210.

Note that, hereinafter, when there is no need to distinguish each of the machine tools 20(*l*) to 20(*n*) individually, they are collectively referred to as "machine tools 20".

The control device 210, for example, is a numerical control device known to those skilled in the art, and generates movement commands based on control information and sends the generated movement commands to the machine tools 20. In this manner, the control device 210 controls movement of the machine tools 20.

Specifically, the control device 210 is a device that controls the machine tools 20 to perform predetermined machining operations. The control device 210 is given a machining program that describes movement of the machine tools 20. Based on the given machining program, the control device 210 creates movement commands including shifting commands for each shaft and rotation commands for a motor that drives the main shaft, and sends these movement commands to the machine tools 20, thereby controlling the motor of the machine tools 20. This enables the machine tool 20 to execute predetermined machining.

The control device 210 sends operation information of the machine tools 20, which includes movement commands, to the operation management device 10. Further, the control device 210 may output operation data appended with time information indicating the time when the machine tool 20 has moved by the movement commands, based on the clock signal from the clock (not illustrated) included in the control device 210, to the operation management device 10.

Note that, in the case where the machine tool 20 is a robot or the like, the control device 210 may be a robot control device or the like.

The devices controlled by the control device 210 are not limited to the machine tools 20 and robots, and can widely be industrial machines applied in general. Industrial machines include, for example, various machines such as machine tools, industrial robots, service robots, forging machines, and injection molding machines.

In the present embodiment, a numerical control device is illustrated as an example of the control device 210.

The cameras 30(*l*) to 30(*m*) are, for example, digital cameras such as surveillance cameras, and are installed in a factory where the machine tools 20 are arranged. The cameras 30(*l*) to 30(*m*) output frame images, which are captured at a predetermined frame rate, as videos to the operation management device 10. Each of the cameras 30(*l*) to 30(*m*) acquires the time of having captured each frame image, based on the clock signal from the clock (not illustrated) included in each of the cameras 30(*l*) to 30(*m*), and outputs the video appended with time information indicating the captured time to the operation management device 10.

Figure 2A:
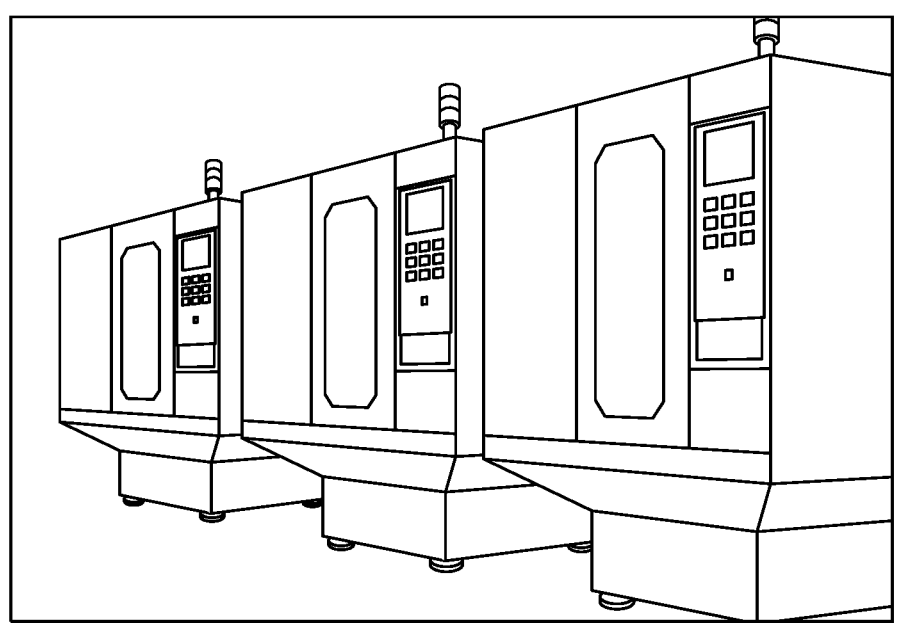
FIG. 2A is a diagram illustrating an example of a video captured by a camera.
Figure 2B:
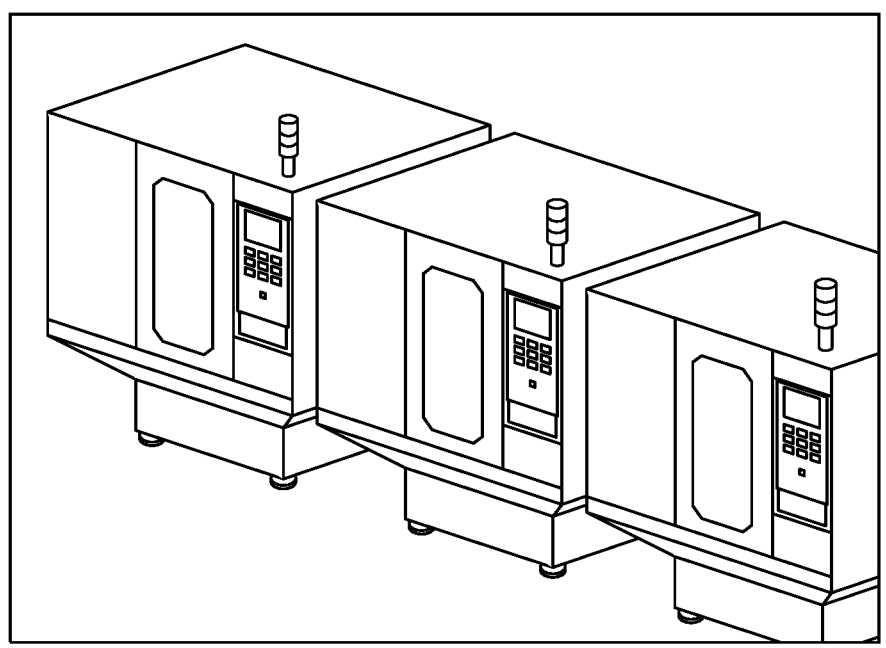
FIG. 2B is a diagram illustrating an example of a video captured by a camera.

FIGS. 2A and 2B are diagrams illustrating examples of videos captured by the camera 30. FIGS. 2A and 2B illustrate videos of the identical three machine tools 20 captured by the two cameras 30 arranged at different positions. That is, one camera 30 and its adjacent camera 30 are arranged to capture a portion of at least one and the same machine tool 20.

Note that, in the following, when there is no need to distinguish each of the cameras 30(*l*) to 30(*m*) individually, they are collectively referred to as "cameras 30".

<Operation Management Device 10>

The operation management device 10 is, for example, a computer.

Figure 3:
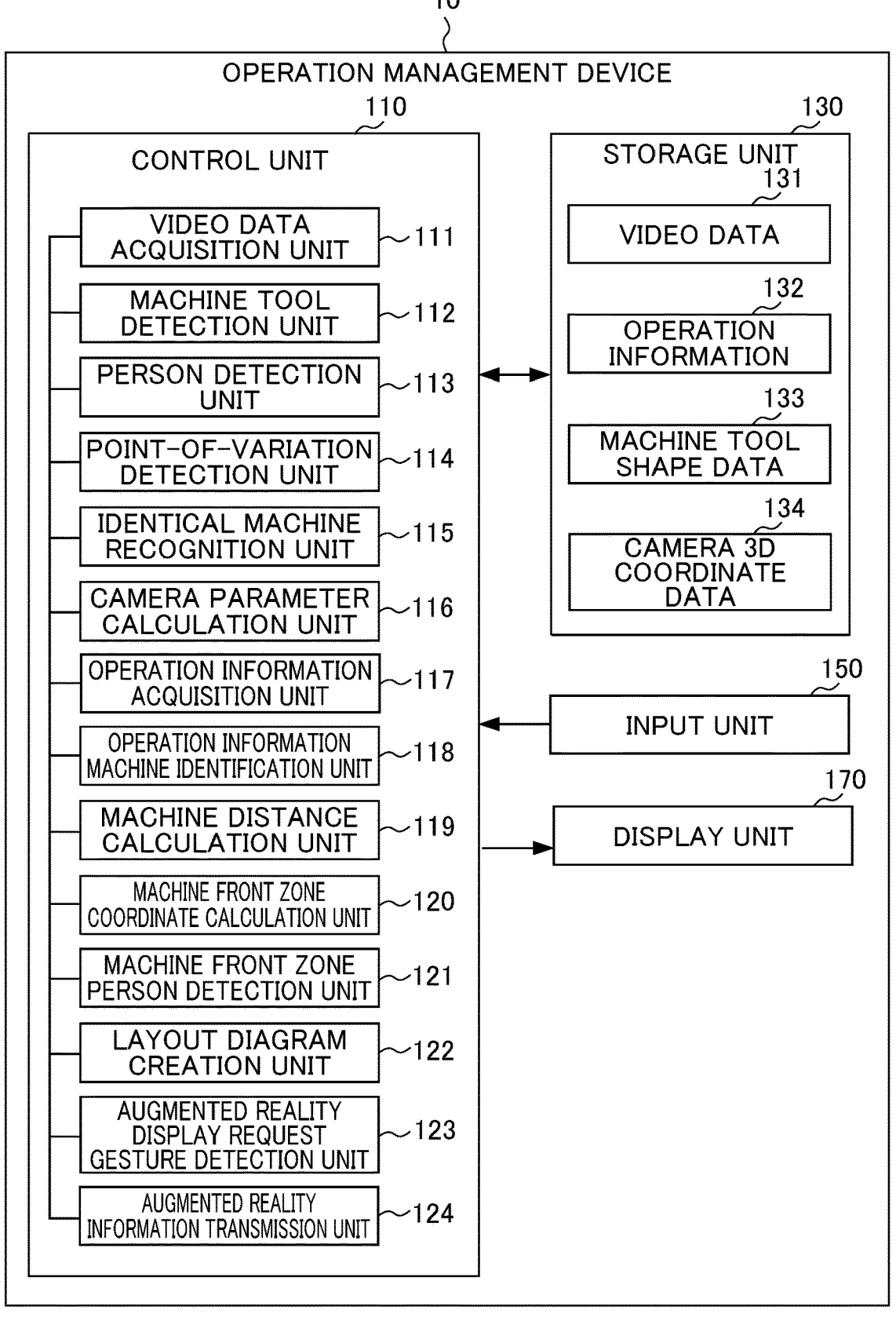
FIG. 3 is a block diagram illustrating a configuration of the operation management device.

FIG. 3 is a block diagram illustrating the configuration of the operation management device 10.

As illustrated in FIG. 3, the operation management device 10 includes a control unit 110, a storage unit 130, an input unit 150, and a display unit 170. The control unit 110 includes a video data acquisition unit 111, a machine tool detection unit 112, a person detection unit 113, a point-of-variation detection unit 114, an identical machine recognition unit 115, a camera parameter calculation unit 116, an operation information acquisition unit 117, an operation information machine identification unit 118, a machine distance calculation unit 119, a machine front zone coordinate calculation unit 120, a machine front zone person detection unit 121, a layout diagram creation unit 122, an augmented reality display request gesture detection unit 123, and an augmented reality information transmission unit 124. The storage unit 130 stores video data 131, operation information 132, machine tool shape data 133, and camera three-dimensional coordinate data 134.

The operation management device 10 may be, for example, configured to have a function of checking and synchronizing the time of the clocks (not illustrated) in the control device 210 and the cameras 30 at a predetermined time interval.

<Storage Unit 130>

The storage unit 130 is, for instance, a Read Only Memory (ROM) or a Hard Disk Drive (HDD), and stores a system program, an operation monitoring application program etc., which are executed by the control unit 110 described later. The storage unit 130 stores the video data 131, the operation information 132, the machine tool shape data 133, and the camera three-dimensional coordinate data.

The video data 131, for example, stores videos captured by each camera 30 and acquired by the video data acquisition unit 111 described later, for each camera 30.

The operation information 132, for instance, stores operation information of each machine tool 20 acquired by the operation information acquisition unit 117 described later, for each machine tool 20.

The machine tool shape data 133 serving as a machine shape storage unit stores a plurality of feature points (for example, corners, logo characters, numerical control (NC) sections, patrol lamps, doors, etc.) registered in advance for each model of the machine tools 20, based on the drawings such as CAD data. The machine tool shape data 133 may store a distance between at least one pair of feature points among the feature points registered in advance, based on the drawings.

Figure 4:
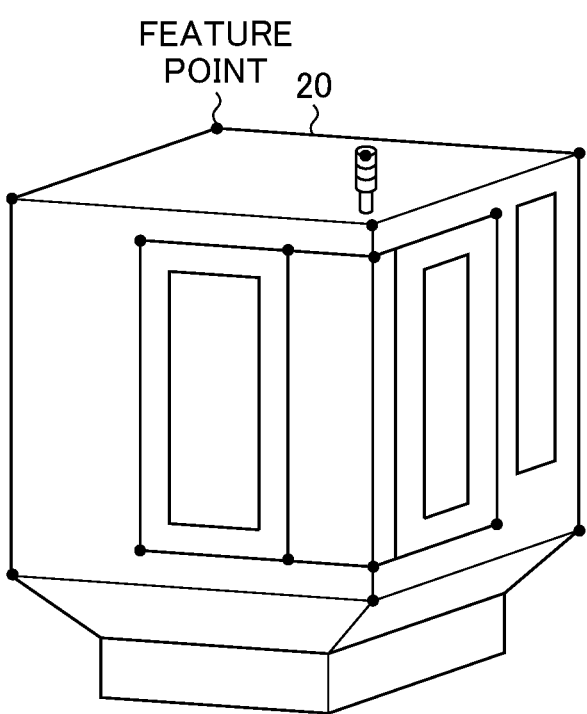
FIG. 4 is a diagram illustrating an example of feature points of a machine tool.

FIG. 4 illustrates an example of feature points of the machine tool 20. In FIG. 4, feature points are represented by the black dots.

The storage unit 130 stores the three-dimensional coordinates in the world coordinate system of the center of the camera lens, which is the origin point of the camera coordinate system that is set for each camera 30 registered in advance. Note that the origin point of the camera coordinate system is set at the center of the camera lens, and the Z-axis of the camera coordinate system is the optical axis of the camera 30, which is the line passing through the center of the lens and perpendicular to the lens surface. The world coordinate system, for example, sets a predetermined position in the factory (such as the corner of the factory floor) as the coordinate origin point.

Hereinafter, the three-dimensional coordinate values in the world coordinate system of the center of the lens of each camera 30 will be referred to as the camera three-dimensional coordinate data 134.

<Input Unit 150>

The input unit 150 is, for example, a keyboard or a touch panel arranged on the display unit 170 described later, and receives a user input. The input unit 150 may function as a camera parameter input unit that receives camera parameters for the cameras 30, or may function as a camera coordinate input unit that receives the three-dimensional coordinates indicating the position of the center of the lens of each camera 30 in the world coordinate system, based on the input operations of the user such as an operator.

<Display Unit 170>

The display unit 170 is, for example, an LCD display and may function as a layout diagram information display unit that displays a layout diagram of the machine tools 20 created by the layout diagram creation unit 122 described later.

<Control Unit 110>

The control unit 110 includes a CPU, a ROM, a RAM, a CMOS (Complementary Metal-Oxide-Semiconductor) memory, etc., which are known to those skilled in the art, and are configured to be mutually communicable via a bus.

The CPU is a processor that controls the operation management device 10 overall. The CPU reads the system program and the operation management application program stored in the ROM via the bus, and controls the entire operation management device 10 in accordance with the system program and the operation management application program. As a result, as illustrated in FIG. 2, the control unit 110 is configured to implement the functions of the video data acquisition unit 111, the machine tool detection unit 112, the person detection unit 113, the point-of-variation detection unit 114, the identical machine recognition unit 115, the camera parameter calculation unit 116, the operation information acquisition unit 117, the operation information machine identification unit 118, the machine distance calculation unit 119, the machine front zone coordinate calculation unit 120, the machine front zone person detection unit 121, the layout diagram creation unit 122, the augmented reality display request gesture detection unit 123, and the augmented reality information transmission unit 124. The RAM stores various data such as temporary calculation data and display data. The CMOS memory is backed up by a battery (not illustrated) and configured as a non-volatile memory that maintains the stored state even when the power supply of the operation management device 10 is turned off.

The video data acquisition unit 111 acquires frame images of the videos captured by each camera 30 and appended with time information, from each camera 30. The video data acquisition unit 111 stores the acquired videos as video data 131, for each camera 30.

The machine tool detection unit 112, for example, performs feature point extraction processing, known to those skilled in the art, on the videos acquired by the video data acquisition unit 111, and compares the extracted feature points with the plurality of feature points registered in advance in the machine tool shape data 133 for each machine tool 20, thereby detecting the machine tool 20 captured in the videos.

The person detection unit 113 performs feature point extraction processing, known to those skilled in the art, on the frame images of the videos acquired by the video data acquisition unit 111, and compares the extracted feature points with the feature point data representing human joints and the like (not illustrated) registered in advance in the storage unit 130, thereby detecting a person such as an operator captured in the videos.

The point-of-variation detection unit 114 detects a time-varying feature point and the time when the feature point varied over time, from the videos captured by each camera 30 and the time information appended to the videos, based on the plurality of feature points of the machine tools 20 detected by the machine tool detection unit 112.

Specifically, for example, the point-of-variation detection unit 114 identifies a feature point, which corresponds to a patrol lamp installed on the machine tool 20, as a time-varying feature point, from among the plurality of feature points of the detected machine tool 20. Using the videos captured by the camera 30 and the time information, the point-of-variation detection unit 114 detects the state of the patrol lamp (for example, turning on green indicating operating, yellow indicating stopped, or red indicating an alarm) and the time when the state of the patrol lamp varied (for example, from green to yellow) in the video in which the identified feature point (patrol lamp) is captured.

The point-of-variation detection unit 114 may identify a feature point, which corresponds to a door installed on the machine tool 20, as a time-varying feature point, from among the plurality of feature points of the detected machine tool 20. Using the videos captured by the cameras 30 and the time information, the point-of-variation detection unit 114 may detect the state of the door opened or closed and the time when the door opened or closed, in the videos in which the identified feature point (door) is captured.

The point-of-variation detection unit 114 may store the detected time-varying feature point and the time when the feature point varied over time in the RAM (not illustrated) included in the control unit 110, for each machine tool 20.

The identical machine recognition unit 115 recognizes one or more of the identical machine tools 20 in the videos from each camera 30, based on the time-varying feature point and the time when the feature point varied over time, detected by the point-of-variation detection unit 114.

Specifically, for example, in the videos illustrated in FIGS. 2A and 2B, the identical machine recognition unit 115 recognizes that the three machine tools 20 captured in the videos illustrated in FIGS. 2A and 2B are identical machine tools, based on the states of the patrol lamp and door serving as the time-varying feature points, and the time when the states of the patrol lamp and door varied, detected by the point-of-variation detection unit 114.

The camera parameter calculation unit 116 calculates camera parameters for each camera 30, based on the distance between at least one pair of feature points of the machine tool 20 registered in advance in the machine tool shape data 133, and the distance between the corresponding feature points on the video of the machine tools 20 recognized by the identical machine recognition unit 115.

Specifically, the camera parameter calculation unit 116 uses a known technique (for example, Z. Zhang: A Flexible New Technique for Camera Calibration, IEEE Trans. PAMI, 22, 11 (2000) 1330) to calculate internal and external parameters for each camera 30 as the camera parameters for each camera 30, along with distortion parameters in the videos, based on the videos of the machine tool 20 captured by each camera 30 and including two feature points having a known distance between the feature points.

Note that a checkerboard or the like having a known distance between feature points may be arranged on each machine tool 20, and the camera parameter calculation unit 116 may calculate camera parameters for each camera 30, based on the videos of the machine tools 20 including the checkerboard or the like captured by each camera 30.

The operation information acquisition unit 117 acquires operation information on each machine tool 20, which includes movement commands, from the control device 210 of each machine tool 20. The operation information acquisition unit 117 stores the acquired operation information in the operation information 132, for each machine tool 20.

The operation information machine identification unit 118 identifies which one of the machine tools 20 recognized by the identical machine recognition unit 115 the operation information acquired by the operation information acquisition unit 117 pertains to, based on the variation over time indicated by the operation information acquired by the operation information acquisition unit 117, and the time-varying feature point and the time when the feature point varied over time, detected by the point-of-variation detection unit 114.

Specifically, for example, the operation information machine identification unit 118 identifies a machine tool 20 from among the machine tools 20 recognized by the identical machine recognition unit 115, in which the state of the machine tool 20 such as the state of operating, stopped, alarm, or the door opened or closed, and the time when the state of the machine tool 20 varied respectively match the state of the pilot lamp or door and the time when the state of the pilot lamp or door varied, detected by the point-of-variation detection unit 114, in the operation information acquired by the operation information acquisition unit 117.

The machine distance calculation unit 119 calculates a distance between the feature points of the machine tools 20 recognized by the identical machine recognition unit 115 and each of the cameras 30, based on the camera parameters for each camera 30 calculated by the camera parameter calculation unit 116.

Specifically, for example, the machine distance calculation unit 119 uses the camera parameters for each camera 30 calculated by the camera parameter calculation unit 116 and a known method (for example, Structure for Motion (SEM)) to calculate a distance between each feature point of the machine tools 20 recognized by the identical machine recognition unit 115 in the world coordinate system, and the position of the center of the lens of each camera 30, from the videos captured by each camera 30.

The machine front zone coordinate calculation unit 120 calculates the coordinates of the front zone of the machine tool 20 in the image coordinate system of the videos captured by each camera 30, based on the distance between the feature points of the machine tool 20 and each camera 30 calculated by the machine distance calculation unit 119, and the camera parameters for each camera 30 calculated by the camera parameter calculation unit 116.

Figure 5A:
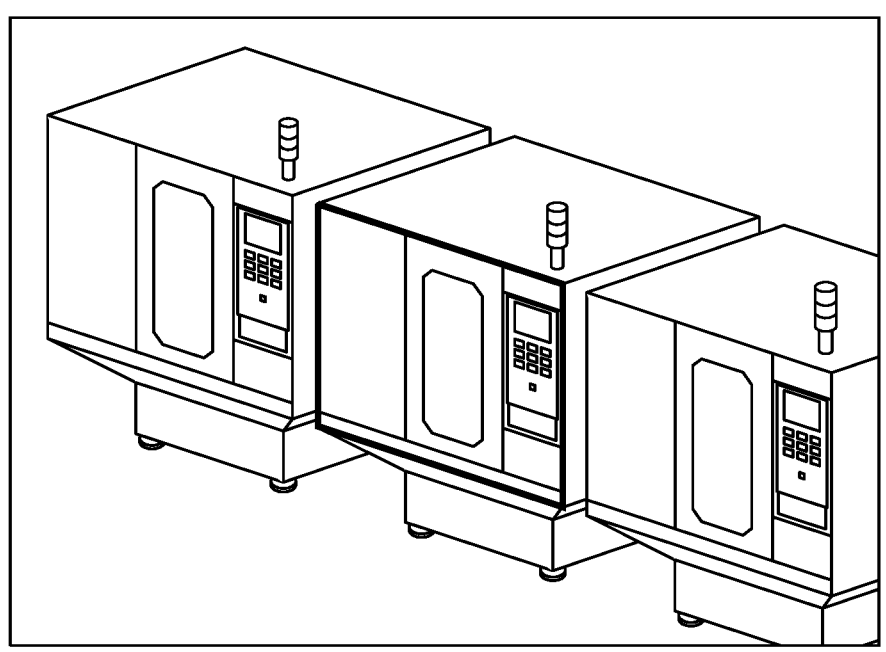
FIG. 5A is a diagram illustrating an example of a plane of a front of the machine tool.

Specifically, as illustrated in FIG. 5A, the machine front zone coordinate calculation unit 120 calculates an equation of the plane indicated by the bold lines representing the front of the machine tool 20 in the world coordinate system, by using the distance from the center of the lens of the camera 30 to the four feature points representing the corners of the front of the machine tool 20, among the feature points of the machine tool 20.

Figure 5B:
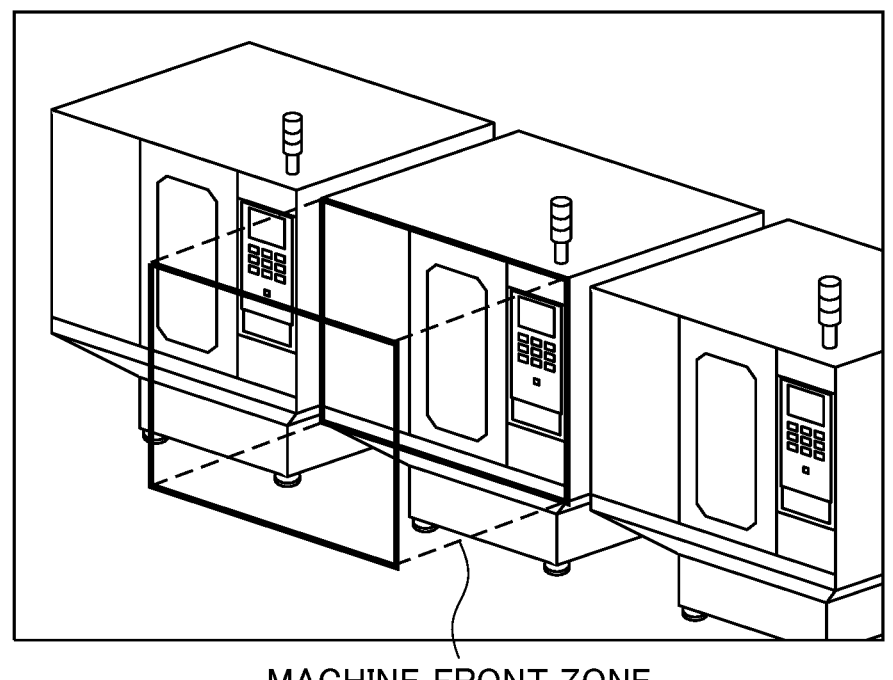
FIG. 5B is a diagram illustrating an example of a plane parallelly moved from the front of the machine tool, as well as a machine front zone.

As illustrated in FIG. 5B, the machine front zone coordinate calculation unit 120 calculates an equation of the plane illustrated by the bold lines, in which the calculated plane of the front of the machine tool 20 in the world coordinate system is parallelly moved a predetermined distance (such as 2 meters) in the direction vertical to the front of the machine tool 20. The machine front zone coordinate calculation unit 120 calculates a zone, which is enclosed by the calculated plane of the front of the machine tool 20 and the parallelly moved plane of the front of the machine tool 20, as a machine front zone.

The machine front zone coordinate calculation unit 120 uses the camera parameters for the cameras 30 to convert the equation of the calculated plane of the front of the machine tool 20 and the parallelly moved plane of the front of the machine tool 20, from the world coordinate system to the image coordinate system of the video of the camera 30. This allows the machine front zone coordinate calculation unit 120 to calculate the machine front zone on the video, as illustrated in FIG. 5B.

The machine front zone person detection unit 121 detects whether a person is included in the front zone of the machine tool 20 (machine front zone) calculated by the machine front zone coordinate calculation unit 120, based on the videos from the cameras 30 that are in a positional relationship allowing for detection with a predetermined degree of accuracy, among the cameras 30.

Specifically, for example, the machine front zone person detection unit 121 sets the minimum values x1, y1 and maximum values x2, y2 respectively in the x-axis and y-axis directions of the front zone of the machine tool 20 (machine front zone) in the image coordinate system of the video calculated by the machine front zone coordinate calculation unit 120, as thresholds.

Figure 6:
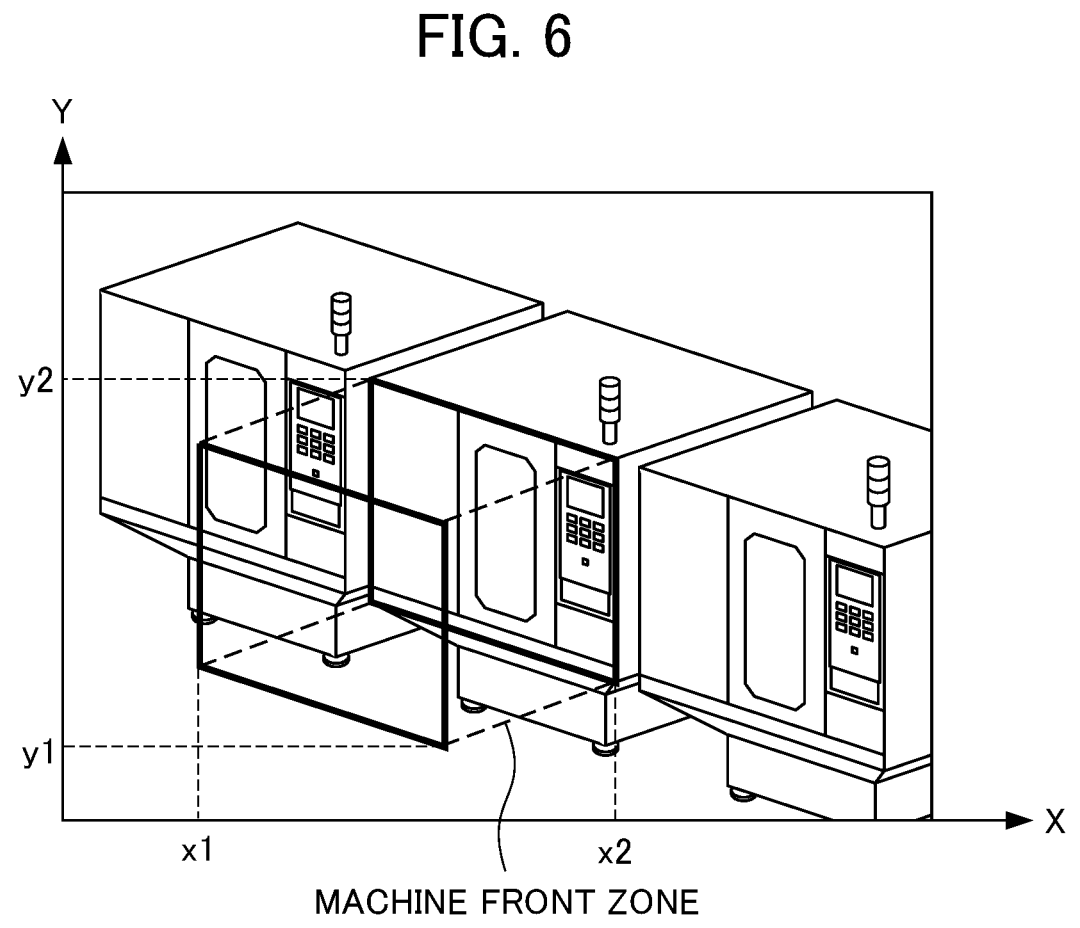

FIG. 6 is a diagram illustrating an example of the relationship between the machine front zone and the thresholds on the video.

Note that when determining whether a person is included in the machine front zone, based on the thresholds, the accuracy may vary depending on the arrangement of the cameras 30. Therefore, the machine front zone person detection unit 121 automatically determines the cameras 30 that are in a positional relationship which can be determined with some degree of accuracy, or in other words, a positional relationship allowing for detection with a predetermined degree of accuracy, among the cameras 30.

Figure 7:
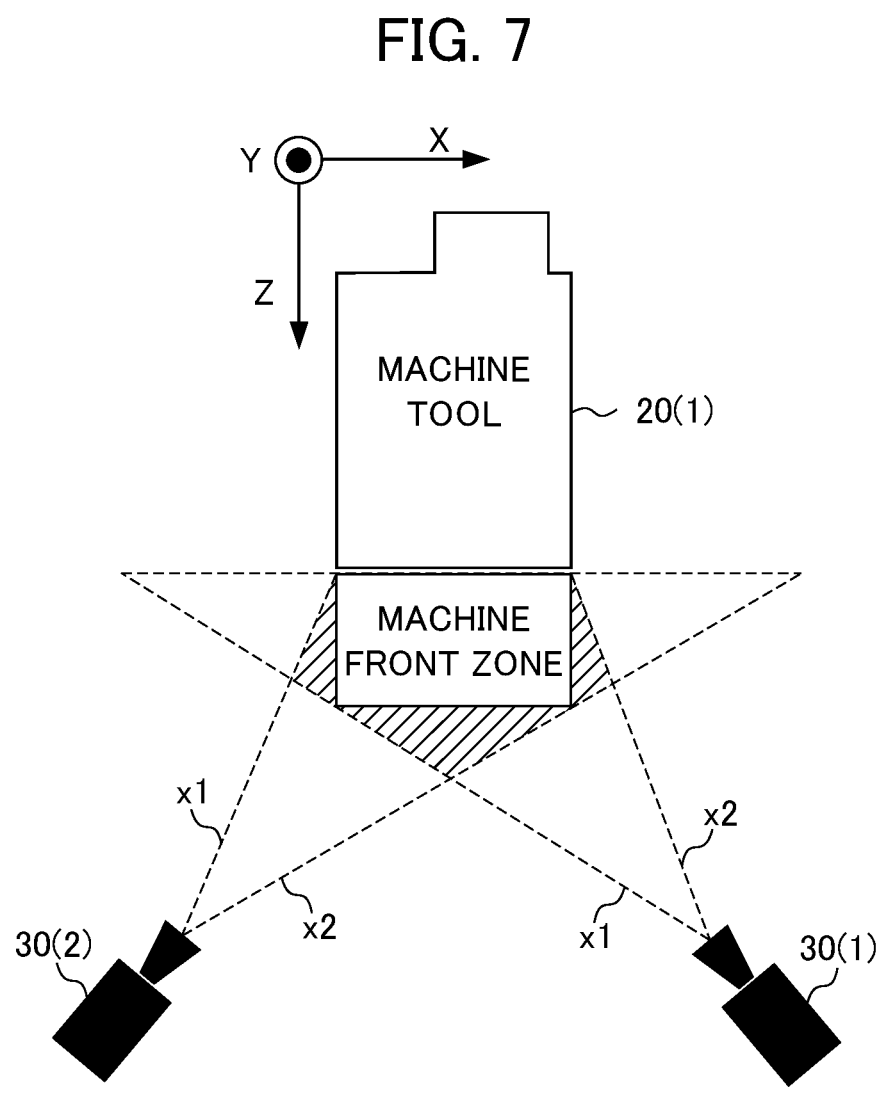

FIG. 7 is a diagram illustrating an example of processing for automatically determining the cameras 30 that are in a positional relationship allowing for detection with a predetermined degree of accuracy. FIG. 7 illustrates the XX plane, in which the machine tool 20(1) is viewed from the +Y axis direction of the world coordinate system, and the two cameras 30(1), 30(2) capture the machine tool 20(1). Note that the same applies to the machine tools 20(2) to 20(n) and the cameras 30(3) to 30(m), and the description will be omitted.

First, as illustrated in FIG. 6, using the external parameters of each of the cameras 30(1), 30(2), the machine front zone person detection unit 121 calculates equations of the four straight lines indicated by the dashed lines, corresponding to the minimum value x1 and the maximum value x2 of the machine front zone in the image coordinate system on the video captured by each of the cameras 30(1), 30(2), in the XZ plane of the world coordinate system.

Next, the machine front zone person detection unit 121 calculates an area of the region indicated by hatching, which is enclosed by the calculated four straight lines and excludes the machine front zone.

Then, if the calculated area is less than a predetermined percentage of the machine front zone (for example, 20% of the machine front zone, or a percentage which can ensure that the area is approximately in front of the machine tool 20(1)), the machine front zone person detection unit 121 determines that the cameras 30(1), 30(2) are in a positional relationship which can be determined with some degree of accuracy, or in other words, a positional relationship allowing for detection with a predetermined degree of accuracy.

If there are pixels of videos indicating the whole body, feet, arms, etc. of a person detected by the person detection unit 113, within the range of the thresholds x1 and x2 and the thresholds y1 and y2, in the videos from the cameras 30(1), 30(2), etc. that have been determined to be in a positional relationship allowing for detection with a predetermined degree of accuracy, the machine front zone person detection unit 121 determines that there is a person in the machine front zone.

The layout diagram creation unit 122 creates a layout diagram arranged with icons of the machine tools 20 recognized by the identical machine recognition unit 115, based on the distance between each characteristic point of the machine tools 20 and the position of the center of the lens of each camera 30 calculated by the machine distance calculation unit 119, and the three-dimensional coordinates of the position of the center of the lens of each camera 30 registered in advance in the camera three-dimensional coordinate data 134.

Figure 8:
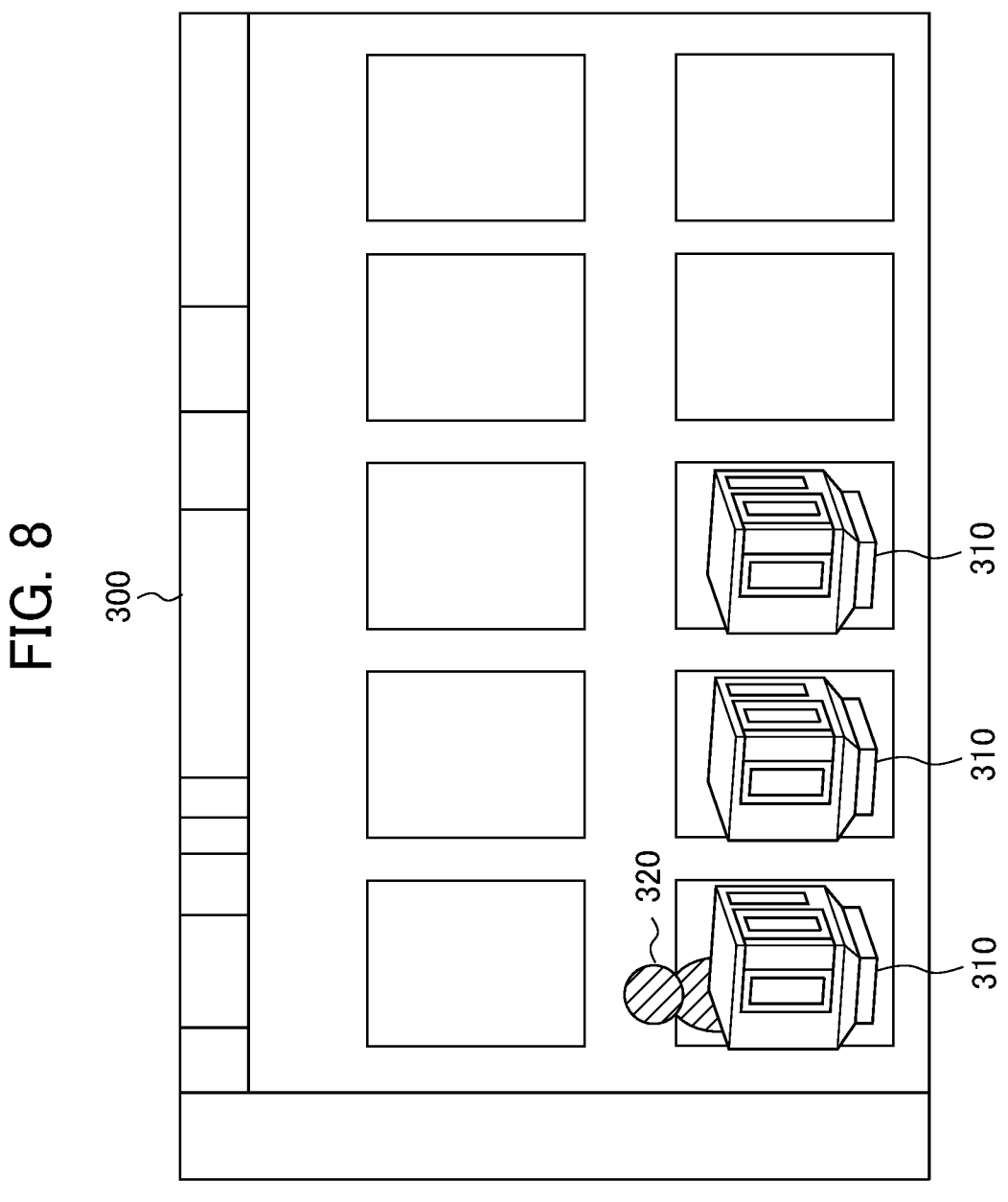
FIG. 8 is a diagram illustrating an example of a layout diagram.

FIG. 8 is a diagram illustrating an example of a layout diagram.

As illustrated in FIG. 8, the layout diagram creation unit 122 calculates the coordinates of the machine tool 20 in the world coordinate system, based on the distance between each characteristic point of the machine tool 20 and the position of the center of the lens of each camera 30 calculated by the machine distance calculation unit 119. The layout diagram creation unit 122 creates a layout diagram 300, which is a plan view (or bird's-eye view) arranged with icons 310 representing the machine tools 20, based on the calculated coordinates of the machine tools 20 and the three-dimensional coordinates of the position of the center of the lens of each camera 30 in the camera three-dimensional coordinate data 134. The layout diagram creation unit 122 may display the icon 310 in green when the machine tool 20 is moving, display the icon 310 in yellow when the machine tool 20 is stopped, and display the icon 310 in red or the like when the machine tool 20 is in an alarm state. When the machine front zone person detection unit 121 detects a person in the machine front zone of the machine tool 20, the layout diagram creation unit 122 may display an icon 320 of a person overlaid with the icon 310 of the machine tool 20.

Then, the layout diagram creation unit 122 displays the created layout diagram 300 in real time on the display unit 170 as the layout diagram information display unit.

Note that the layout diagram creation unit 122 uses the coordinate values registered in the camera three-dimensional coordinate data 134 as the three-dimensional coordinates in the world coordinate system of the position of the center of the lens of each camera 30 when creating the layout diagram 300; however, coordinate values that are input by an operator or the like through the input unit 150 may also be used.

The augmented reality display request gesture detection unit 123 detects a gesture of a person requesting display of augmented reality, which overlays the virtual on the real, in the video where a person is detected by the machine front zone person detection unit 121.

Figure 9A:
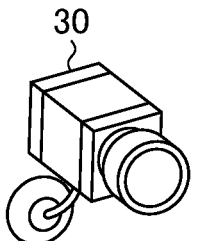
FIG. 9A is a diagram illustrating an example of a gesture of a person requesting display of augmented reality.
Figure 9A:
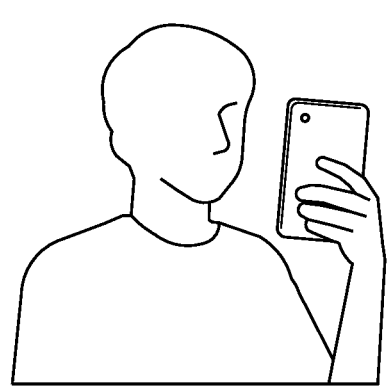
Figure 9B:
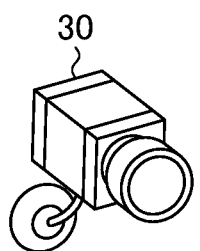
FIG. 9B is a diagram illustrating an example of a gesture of a person requesting display of augmented reality.
Figure 9B:
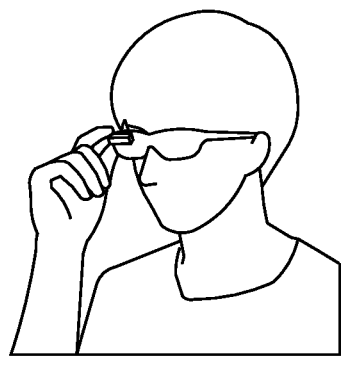

FIGS. 9A and 9B are diagrams illustrating examples of gestures of a person requesting display of augmented reality.

As illustrated in FIGS. 9A and 9B, when the camera 30 captures a person holding up a smartphone or tablet device or the like towards the machine tool 20, or a person wearing a wearable device such as augmented reality (AR: Augmented Reality) device, the augmented reality display request gesture detection unit 123 detects the pose of holding up a smartphone or the like towards the machine tool 20 or the wearing of a wearable device, in the captured video.

The augmented reality information transmission unit 124 sequentially generates AR image data, which includes the operation information of the machine tool 20 having the machine front zone where the person performing the gesture detected by the augmented reality display request gesture detection unit 123 exists, and sends the generated AR image data to smartphones, tablet devices, wearable devices, etc., which serve as the augmented reality display unit to display augmented reality.

Figure 10:
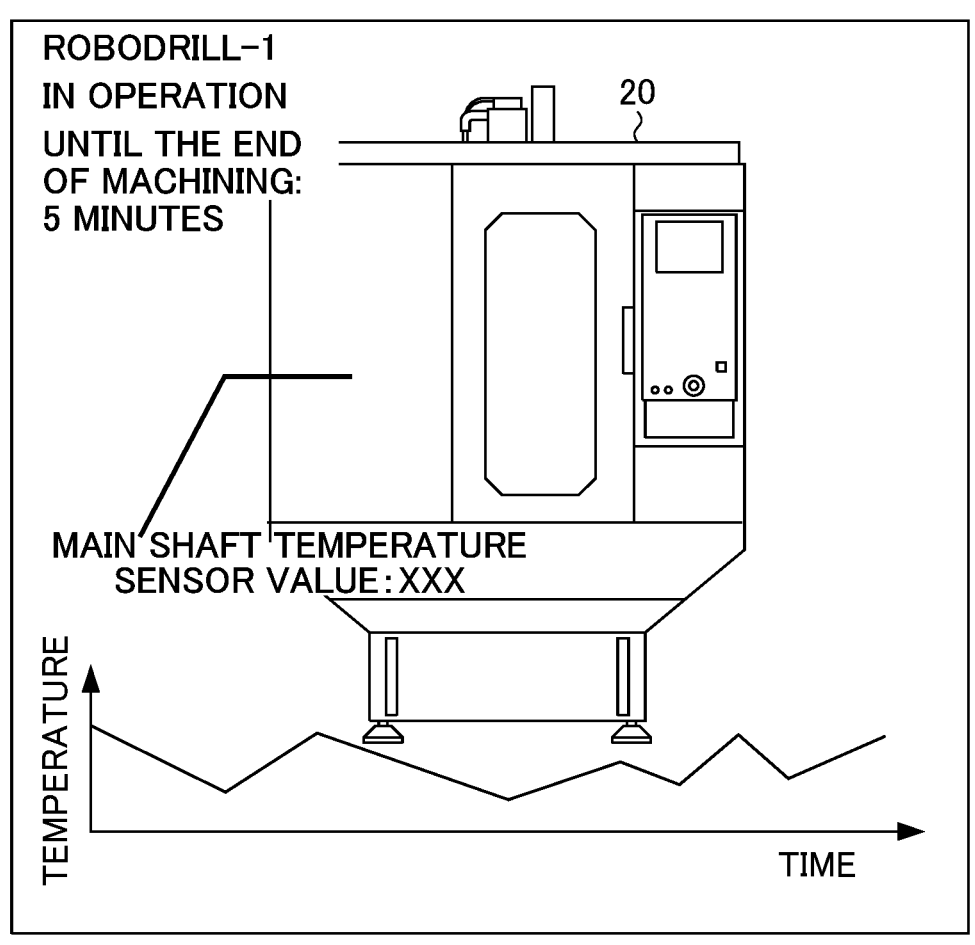
FIG. 10 is a diagram illustrating an example of an AR image.

FIG. 10 is a diagram illustrating an example of an AR image.

As illustrated in FIG. 10, for example, the smartphone or the like adjusts the position and posture of the received AR image data, based on the camera coordinate system of the camera included in the smartphone or the like (not illustrated), and displays the real space image captured by the camera of the smartphone or the like (not illustrated) and the received AR image.

The AR image includes, for example, the model name of the machine tool 20, "ROBODRILL-1", and the operation information such as "in operation", "until the end of machining: 5 minutes". The AR image may include "Main Shaft Temperature Sensor Value: XXX" as operation information, and a graph of the chronological data of the main shaft temperature sensor value.

<Management Processing of Operation Management Device 10>

Next, operations pertaining to management processing of the operation management device 10 will be described.

Figure 11:
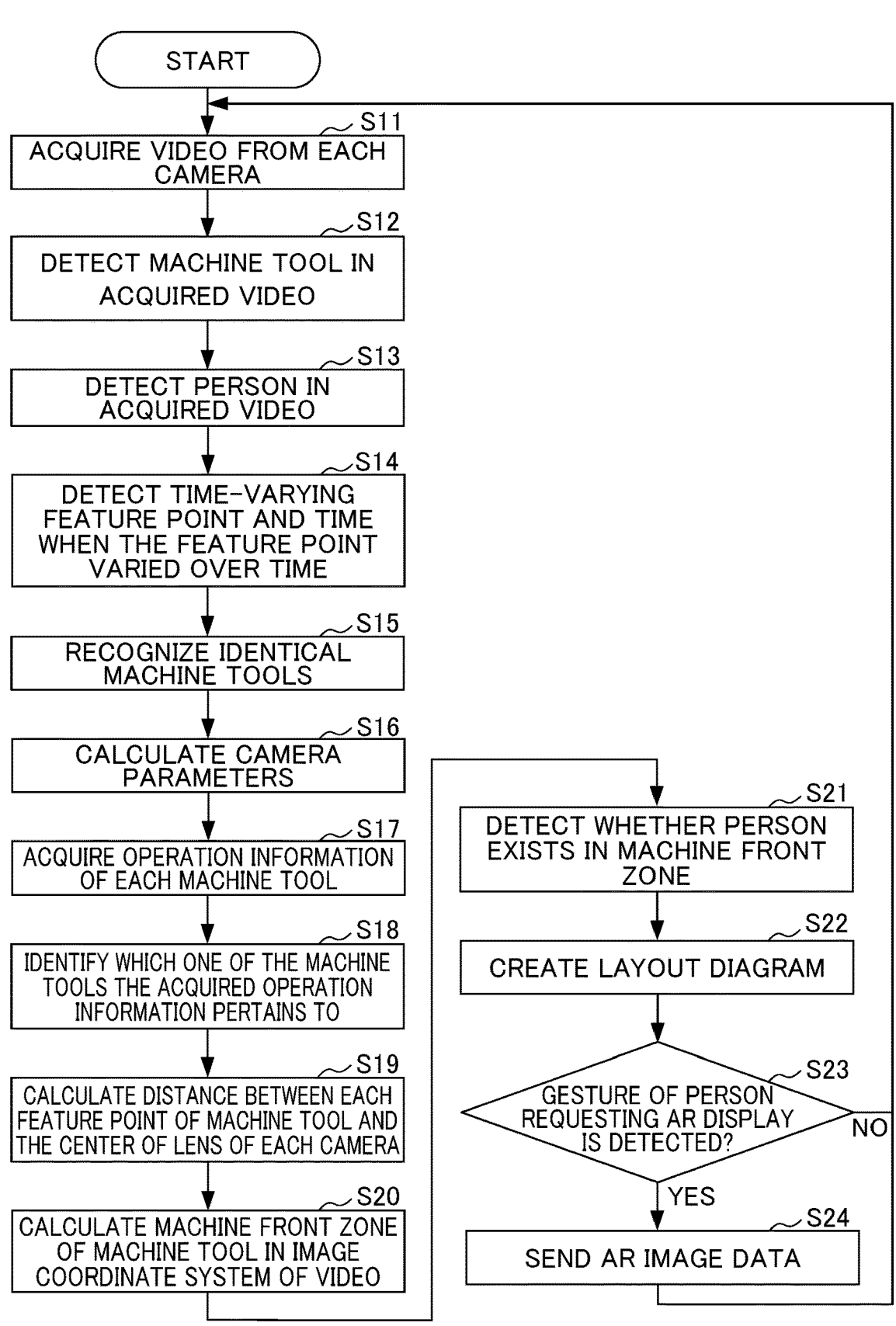
FIG. 11 is a flowchart illustrating management processing of the operation management device.

FIG. 11 is a flowchart illustrating management processing of the operation management device 10. The flow illustrated herein is repeatedly executed while the management processing is being executed.

In Step S11, the video data acquisition unit 111 acquires a video captured by each camera 30, from each camera 30.

In Step S12, the machine tool detection unit 112 performs feature point extraction processing on the video acquired in Step S11, compares the extracted feature points with a plurality of feature points of each machine tool 20 registered in advance in the machine tool shape data 133, and detects the machine tool 20 captured in the video.

In Step S13, the person detection unit 113 performs feature point extraction processing on the frame image of the video acquired in Step S11, compares the extracted feature points with the feature point data of human joints or the like (not illustrated) registered in advance in the memory unit 130, and detects a person captured in the video.

In Step S14, the point-of-variation detection unit 114 detects a time-varying feature point and the time when the feature point varied over time, based on the plurality of feature points of the machine tool 20 detected in Step S12, from the video captured by each camera 30 and the time information appended to the video.

In Step S15, the identical machine recognition unit 115 recognizes identical machine tools 20 in the video from each camera 30, based on the time-varying feature point and the time when the feature point varied over time, as detected in Step S14.

In Step S16, the camera parameter calculation unit 116 calculates camera parameters for each camera 30, based on the distance between the feature points in the machine tool 20 registered in advance in the machine tool shape data 133, and the distance between the corresponding feature points on the video of the machine tool 20 as recognized in Step S15.

In Step S17, the operation information acquisition unit 117 acquires operation information of each machine tool 20, which includes movement commands, from the control device 210 of each machine tool 20.

In Step S18, the operation information machine identification unit 118 identifies which one of the machine tools 20 recognized in Step S15 the operation information acquired in Step S17 pertains to, based on the variation over time indicated by the operation information acquired in Step S17, and the time-varying feature point as well as the time when the feature point varied over time, as detected in Step S14.

In Step S19, the machine distance calculation unit 119 calculates a distance between each feature point of the machine tool 20 recognized in Step S15 and the position of the center of the lens of each camera 30, based on the camera parameters for each camera 30 calculated in Step S16.

In Step S20, the machine front zone coordinate calculation unit 120 calculates the machine front zone of the machine tool 20 in the coordinates in the image coordinate system of each video from the camera 30, based on the distance between each feature point of the machine tool 20 and the position of the center of the lens of each camera 30 as calculated in Step S19, and the camera parameters for each camera 30 as calculated in Step S16.

In Step S21, the machine front zone person detection unit 121 detects whether a person is included in the machine front zone of the machine tool 20 calculated in Step S20, based on the videos from the cameras 30 that are in a positional relationship allowing for detection with a predetermined degree of accuracy, among the cameras 30.

In Step S22, the layout diagram creation unit 122 creates a layout diagram 300 arranged with the icons 310 of the machine tools 20 recognized in Step S15, based on the distance between each feature point of the machine tool 20 and the position of the center of the lens of each camera 30 calculated in Step S19, and the three-dimensional coordinates of the position of the center of the lens of each camera 30 registered in advance in the camera three-dimensional coordinate data 134.

In Step S23, the augmented reality display request gesture detection unit 123 determines whether a gesture of a person requesting display of augmented reality is detected in the video, in which a person was detected by the machine front zone person detection unit 121. If a gesture of a person requesting display of augmented reality is detected, the processing advances to Step S24. If a gesture of a person requesting display of augmented reality is not detected, the processing returns to Step S11.

In Step S24, the augmented reality information transmission unit 124 sequentially generates AR image data, which includes the operation information of the machine tool 20 having the machine front zone where the person performing the gesture detected in Step S23 exists, and sends the generated AR image data to the devices such as smartphones.

As described above, the operation management device 10 according to one embodiment can easily create a layout diagram of the plurality of machine tools 20 arranged in a factory by using videos captured by the plurality of cameras 30.

The operation management device 10 can quickly and easily determine whether there is a person in the machine front zone of the machine tool 20 without calculating the three-dimensional coordinates of the standing position of the person.

The operation management device 10 can recognize the operation information of which machine tool 20 should be displayed in augmented reality, based on a gesture of a person requesting display of augmented reality, without acquiring location information of devices such as smartphones or location information of the machine tool 20, for which the operation information is desired to be displayed in augmented reality.

Although one embodiment has been described above, the operation management device 10 is not limited to the aforementioned embodiment and may include variations and improvements within the scope of achieving the purpose.

Modified Example

In the one embodiment above, the operation management device 10 has been described as a single computer; however, the present invention is not limited thereto. For example, the server may include part or all of the functions such as: the video data acquisition unit 111, the machine tool detection unit 112, the person detection unit 113, the point-of-variation detection unit 114, the identical machine recognition unit 115, the camera parameter calculation unit 116, the operation information acquisition unit 117, the operation information machine identification unit 118, the machine distance calculation unit 119, the machine front zone coordinate calculation unit 120, the machine front zone person detection unit 121, the layout diagram creation unit 122, the augmented reality display request gesture detection unit 123, and the augmented reality information transmission unit 124 of the operation management device 10. Each function of the operation management device 10 may be implemented using a virtual server function on the cloud.

Further, the operation management device 10 may also function as a distributed processing system having the functions of the operation management device 10 appropriately distributed across a plurality of servers.

Note that each function included in the operation management device 10 according to one embodiment can be implemented by hardware, software, or a combination thereof. Here, implementation by software means implementation by a computer reading and executing a program.

The program can be stored using various types of non-transitory computer-readable media and supplied to a computer. Non-transitory computer-readable media include various types of tangible storage media. Examples of non-transitory computer-readable media include magnetic storage media (e.g., floppy disks, magnetic tapes, hard disk drives), magneto-optical storage media (e.g., magneto-optical disks), CD-ROM (Read Only Memory), CD-R, CD-R/W, semiconductor memories (e.g., Mask ROM, PROM (Programmable ROM), EPROM (Erasable PROM), Flash ROM, RAM). The program may also be supplied to a computer by various types of transitory computer-readable media. Examples of transitory computer-readable media include electrical signals, optical signals, and electromagnetic waves. Transitory computer-readable media can supply programs to a computer via wired communication paths such as electric wires and optical fibers, or via wireless communication paths.

Note that the steps to describe the program recorded on a recording medium include not only processing executed in a chronological sequence, but also processing executed in parallel or individually, not necessarily chronologically.

In other words, the operation management device disclosed herein can take various embodiments with the following configurations.

(1) The operation management device 10 of the present disclosure is an operation management device that displays an icon representing at least one machine tool 20 as arranged on a layout diagram representing an outline of a facility where the machine tool 20 is installed, in which the operation management device includes: a machine tool detection unit 112 configured to detect the machine tool 20 installed in the facility from a video from each of a plurality of cameras 30 installed in the facility, based on a plurality of feature points of each machine tool 20 registered in advance in machine tool shape data 133; a point-of-variation detection unit 114 configured to detect, from among the plurality of feature points of the machine tool 20 detected, a time-varying feature point and a time when the feature point varied over time, from a video from each of the plurality of cameras 30; an identical machine recognition unit 115 configured to recognize one or more machine tools 20 in a video from each of the plurality of cameras 30, based on the time-varying feature point and the time when the feature point varied over time, detected by the point-of-variation detection unit 114; a camera parameter calculation unit 116 configured to calculate a camera parameter for each of the plurality of cameras 30, based on a distance between at least one pair of feature points registered in advance in the machine tool shape data 133, and a distance between the feature points in a video of the machine tools 20 recognized by the identical machine recognition unit 115; a machine distance calculation unit 119 configured to calculate a distance between each feature point of the machine tools 20 recognized by the identical machine recognition unit 115 and a center of a lens of each of the plurality of cameras 30, based on the camera parameter for each of the plurality of cameras 30 calculated by the camera parameter calculation unit 116; and a layout diagram creation unit 122 configured to create the layout diagram 300 arranged with icons 310 of the machine tools 20 recognized, based on the distance between each feature point of the machine tools 20 and the center of the lens of each of the plurality of cameras 30 calculated by the machine distance calculation unit 119, and the three-dimensional coordinates of the center of the lens of each of the plurality of cameras 30 registered in advance.

With this operation management device 10, the layout diagram 300 of the machine tools 20 arranged in the factory can be easily created by using videos captured by the plurality of cameras 30.

(2) The operation management device 10 of (1) may further include: an operation information acquisition unit 117 configured to acquire operation information on the machine tools 20 from a control device 210 that controls the machine tools 20; and an operation information machine identification unit 118 configured to identify which one of the machine tools 20 recognized by the identical machine recognition unit 115 the operation information acquired by the operation information acquisition unit 117 pertains to, based on a variation over time indicated by the operation information acquired by the operation information acquisition unit 117, and the time-varying feature point and the time when the feature point varied over time, detected by the point-of-variation detection unit 114.

In this manner, the operation management device 10 can reduce the burden on operators and the like by automatically associating the machine tools 20 in the videos with the acquired operation information.

(3) The operation management device 10 of (2) may further include: a machine front zone coordinate calculation unit 120 configured to calculate a front zone of the machine tool 20 in coordinates in an image coordinate system of a video captured by each of the plurality of cameras 30, based on a distance between the feature points of the machine tool 20 and each of the plurality of cameras 30 calculated by the machine distance calculation unit 119, and the camera parameters for each of the plurality of cameras 30 calculated by the camera parameter calculation unit 116; and a machine front zone person detection unit 121 configured to detect whether a person is included in the front zone of the machine tool 20 calculated by the machine front zone coordinate calculation unit 120, based on the video from the cameras 30 that are in a positional relationship allowing for detection with a predetermined degree of accuracy, among the plurality of cameras 30, in which the layout diagram creation unit 122 may arrange, on the layout diagram 300, the operation information of the machine tools 20 identified by the operation information machine identification unit 118 and presence or absence of a person in the front zone of the machine tool 20 detected by the machine front zone person detection unit 121, along with the icons 310 of the machine tools 20, in real time, based on a distance between each feature point of the machine tools 20 and the center of the lens of each of the plurality of cameras 30, calculated by the machine distance calculation unit 119.

In this manner, the operation management device 10 can quickly and easily determine whether a person exists in the machine front zone of the machine tool 20 without having to calculate the three-dimensional coordinates of the standing position of the person.

(4) The operation management device 10 of (3) may further include: an augmented reality display request gesture detection unit 123 configured to detect a gesture of a person requesting display of augmented reality which overlays virtual on real, based on a video of the person detected by the machine front zone person detection unit 121; and an augmented reality information transmission unit 124 configured to transmit augmented reality image data, which includes the operation information of the machine tool 20 having the front zone where the person performing the gesture detected by the augmented reality display request gesture detection unit 123 exists, to an external device.

In this manner, the operation management device 10 can recognize the operation information of which machine tool 20 should be displayed augmented reality, based on a gesture of a person requesting display of augmented reality, without acquiring location information of devices such as smartphones, or location information of the machine tool 20, for which the operation information is desired to be displayed in augmented reality.

EXPLANATION OF REFERENCE NUMERALS

1: operation management system
10: operation management device
110: control unit
111: video data acquisition unit
112: machine tool detection unit
113: person detection unit
114: point-of-variation detection unit
115: identical machine recognition unit
116: camera parameter calculation unit
117: operation information acquisition unit
118: operation information machine identification unit
119: machine distance calculation unit
120: machine front zone coordinate calculation unit
121: machine front zone person detection unit
122: layout diagram creation unit
123: augmented reality display request gesture detection unit
124: augmented reality information transmission unit
130: storage unit
131: video data
132: operation information
133: machine tool shape data
134: camera three-dimensional coordinate data
150: input unit
170: display unit
20(*l*) to 20(*n*): machine tool
210: control device
30(*l*) to 30(*m*): camera

The invention claimed is:

1. An operation management device that displays an icon representing at least one industrial machine as arranged on a layout diagram representing an outline of a facility where the industrial machine is installed, the operation management device comprising:

a machine tool detection unit configured to detect the industrial machine installed in the facility, from a video from each of a plurality of cameras installed in the facility, based on a plurality of feature points of each industrial machine registered in advance in a machine shape storage unit, the plurality of cameras being arranged at different positions such that one camera and another camera adjacent to the one camera capture at least one and the same machine tool;

a point-of-variation detection unit configured to detect, from among the plurality of feature points of the industrial machine detected, a time-varying feature point and a time when the feature point varied over time, from a video from each of the plurality of cameras;

an identical machine recognition unit configured to recognize one or more industrial machines in a video from each of adjacent cameras among the plurality of cameras, based on the time-varying feature point and the time when the feature point varied over time, detected by the point-of-variation detection unit;

a camera parameter calculation unit configured to calculate a camera parameter for each of the plurality of cameras, based on a distance between at least one pair of feature points registered in advance in the machine shape storage unit, and a distance between the feature points in a video of the industrial machines recognized by the identical machine recognition unit;

a machine distance calculation unit configured to calculate a distance between each feature point of the industrial machines recognized by the identical machine recognition unit and a center of a lens of each of the plurality of cameras, based on the camera parameter for each of the plurality of cameras calculated by the camera parameter calculation unit; and a layout diagram creation unit configured to create the layout diagram arranged with icons of the industrial machines recognized, based on the distance between each feature point of the industrial machines and the center of the lens of each of the plurality of cameras calculated by the machine distance calculation unit, and three-dimensional coordinates of the center of the lens of each of the plurality of cameras registered in advance.

2. The operation management device according to claim 1, further comprising:

an operation information acquisition unit configured to acquire operation information on the industrial machine from a control device that controls the industrial machine; and an operation information machine identification unit configured to identify which one of the industrial machines recognized by the identical machine recognition unit the operation information acquired by the operation information acquisition unit pertains to, based on a variation over time indicated by the operation information acquired by the operation information acquisition unit, and the time-varying feature point and the time when the feature point varied over time, detected by the point-of-variation detection unit.

3. The operation management device according to claim 2, further comprising:

a machine front zone coordinate calculation unit configured to calculate a front zone of the industrial machine in coordinates in an image coordinate system of a video captured by each of the plurality of cameras, based on a distance between the feature points of the industrial machine and each of the plurality of cameras calculated by the machine distance calculation unit, and the camera parameter for each of the plurality of cameras calculated by the camera parameter calculation unit; and a machine front zone person detection unit configured to detect whether a person is included in the front zone of the industrial machine calculated by the machine front zone coordinate calculation unit, based on the video from the cameras that are in a positional relationship allowing for detection with a predetermined degree of accuracy, among the plurality of cameras, wherein the layout diagram creation unit arranges, on the layout diagram, the operation information of the industrial machines identified by the operation information machine identification unit and presence or absence of a person in the front zone of the industrial machine detected by the machine front zone person detection unit, along with the icons of the industrial machines, in real time, based on a distance between each feature point of the industrial machines and the center of the lens of each of the plurality of cameras, calculated by the machine distance calculation unit.

4. The operation management device according to claim 3, further comprising:

an augmented reality display request gesture detection unit configured to detect a gesture of a person requesting display of augmented reality which overlays virtual on real, based on a video of the person detected by the machine front zone person detection unit; and an augmented reality information transmission unit configured to transmit augmented reality image data, which includes the operation information of the industrial machine having the front zone where the person performing the gesture detected by the augmented reality display request gesture detection unit exists, to an external device.

*     *     *     *     *